United States Patent Office 2,886,385
Patented May 12, 1959

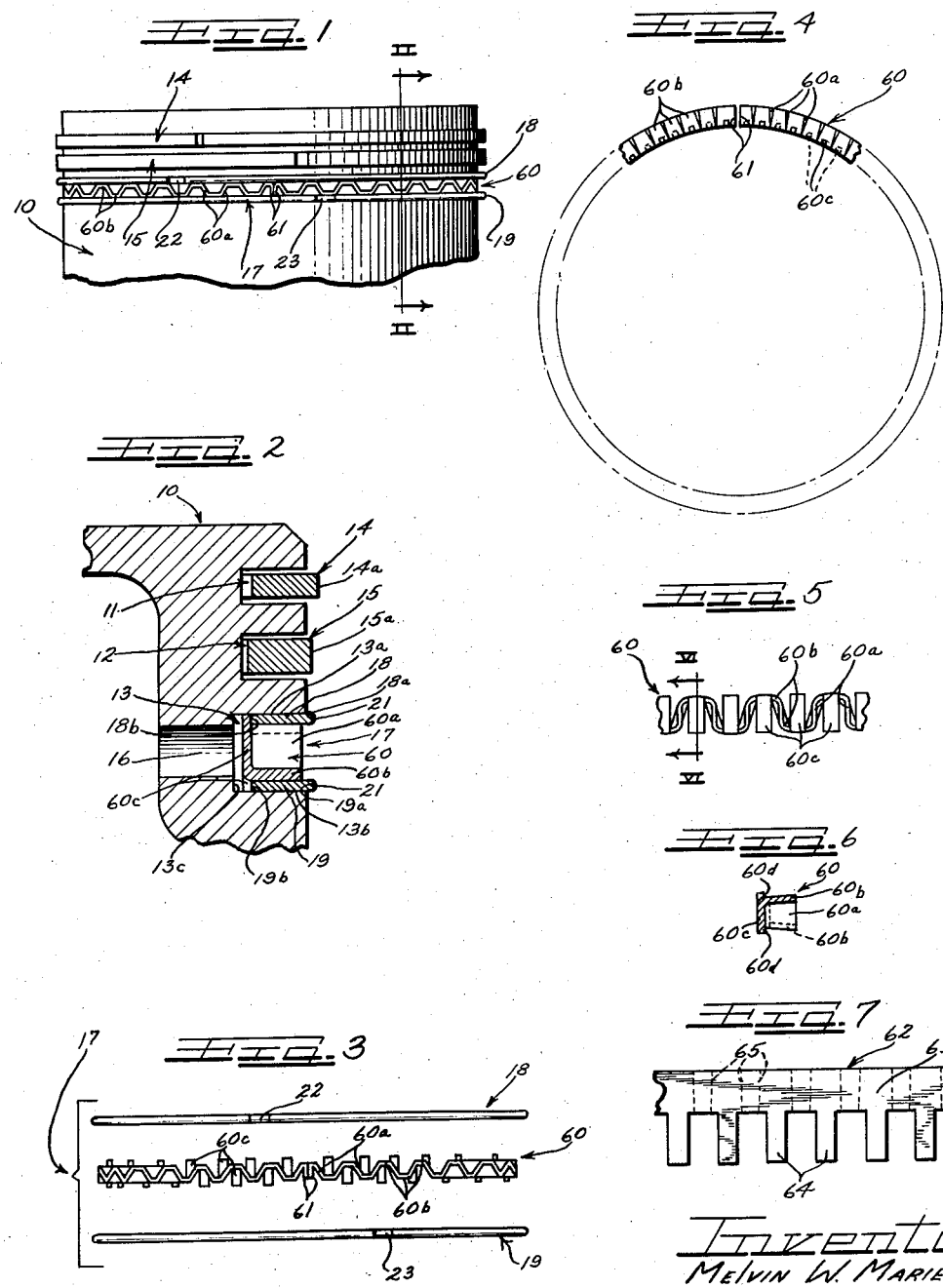

2,886,385

PISTON RING

Melvin W. Marien, Brentwood, Mo., assignor to Ramsey Corporation, St. Louis, Mo., a corporation of Ohio Original application May 2, 1956, Serial No. 582,229, now Patent No. 2,831,738, dated April 22, 1958. Divided and this application March 14, 1958, Serial No. 721,439

6 Claims. (Cl. 309—45)

This invention relates to packing ring assemblies having cylinder wall engaging rings held in operative position by a combination expander and spacer ring. Specifically, this invention deals with an oil control piston ring assembly having top and bottom flat thin ring segments or rails and a self-expanding open-type ring between and behind the thin rings or rails to space and expand the thin rings or rails.

The present application is a division of my copending application Serial No. 582,229, filed May 2, 1956, now Patent No. 2,831,738 which, in turn, is a division of my U.S. Patent No. 2,744,803, granted May 8, 1956, from an application filed August 9, 1952.

This invention will hereinafter be specifically described as embodied in a piston ring assembly for pistons of internal combustion engines but it should be understood that the ring assemblies of this invention are generally useful as packing rings to control lubrication of relatively movable parts.

According to this invention, there is provided a stack of rings including top and bottom flat thin steel rail segments and an intermediate combination expander and spacer ring. This intermediate ring extends between and behind the steel rings or rails and is a radially compressible self-expanding flexible sheet metal ring adapted to exert equal expansion loads around the entire circumference of each of the thin rings or rails. These rail rings or segments are preferably provided with chromium-plated outer rounded peripheries to present hard-wear-resisting edges to the cylinder wall.

The combination expander and spacer ring has vertical or axially extending corrugations or convolutions with abutted together end edges providing a continuous ring. The convolutions include sloping legs connected by flat top and bottom portions which form radially extending segment or rail ring supporting crowns at the top and bottom of the legs. Tabs are formed at the radial inner edges of the flat top and bottom portions and extend alternately, upwardly and downwardly from these top and bottom portions to provide upstanding legs around the inner periphery of the ring. These legs project alternately above and below the crowns or flat top and bottom portions to provide abutment shoulders receiving the ring segments or rails thereagainst.

In the combination expander and spacer ring of this invention the sloping legs extend between rail rings or segments supported by the flat top and bottom crowns or loops of the corrugations. When an assembly of the spacer and expander ring, together with the rail rings, is circumferentially compressed, as when assembled in a piston ring groove, the portions of the tabs projecting beyond the rail ring supporting crowns or loops will engage the inner peripheries of the rails and exert a radially expanding force to assist the expansion of these rails against the wall of the cylinder in which the piston reciprocates. The ring assembly does not bottom on the inner end of the ring groove, and the outer peripheries of the rails extend beyond the outer periphery of the corrugated spacer and expander. The assembly has open spaces therethrough adapted to communicate with oil vent holes in the piston for controlling drainage of oil between the thin ring segments or rails.

An important feature of this invention resides in the provision of a single ring having the dual capacity of supporting the ring segments or rails in spaced operative position while at the same time radially expanding these rings against the cylinder wall.

Another important feature of this invention is to provide an oil control piston ring assembly wherein separate ring segments are evenly loaded around their entire circumference by a separator ring.

It is then, an object of this invention to provide a packing ring having a plurality of thin flat sealing rings and a single circumferential expander spacer ring holding the thin rings in spaced relation while urging the rings radially outward around their entire periphery.

A further object of the invention is to provide a piston ring assembly especially adapted for the oil ring groove of pistons wherein a single spring ring acts as an expander and a spacer.

A still further object of the invention is to provide an oil control ring for internal combustion engine pistons wherein a one-piece radially expansible ring supports a plurality of sealing rings in spaced operative relation.

A further object of this invention is to provide an oil control ring for the oil grooves of internal combustion engine pistons which has a pair of spaced-opposed thin flat steel segment rings with outer peripheral edges having a hard wearable chromium plating thereon and with a spring metal corrugated ring coextending between and behind the thin rings to support the same against the top and bottom side walls of the ring groove to seat their hard outer edges on a cylinder wall receiving the piston.

A specific object of this invention is to provide an axially corrugated combination spacer and expander piston ring having flat top and bottom rail ring supporting segments or crowns connected by sloping legs and having tabs on the inner peripheral ends of the crowns extending alternately, upwardly and downwardly to provide upstanding legs around the inner periphery of the ring forming abutment shoulders to expand rail or segment rings supported on the crowns.

A still further specific object of this invention is to provide a combined spacer and expander piston ring formed from a flat ribbon of spring steel having laterally projecting legs at spaced intervals along one edge thereof which is axially corrugated to provide sloping legs connecting top and bottom flat crowns and having the radially projecting legs alternately bent up and down to form abutment shoulders at the inner periphery of the ring for expanding rail rings supported on the crowns.

Other and further objects of this invention will become apparent to those skilled in the art from the following detailed description of the annexed sheet of drawings which, by way of a preferred example illustrates one embodiment of this invention.

On the drawing:

Fig. 1 is a side elevational view of a piston equipped with an oil ring assembly of this invention.

Fig. 2 is an enlarged fragmentary vertical cross-sectional view taken along the line II—II of Fig. 1.

Fig. 3 is an exploded elevational view of the oil groove piston ring assembly shown in Figs. 1 and 2.

Fig. 4 is a plan view of the expander and spacer ring for the oil control piston ring assembly.

Fig. 5 is an enlarged fragmentary side elevational view of the ring of Fig. 4.

Fig. 6 is a cross-sectional view of the ring of Fig. 5 taken along the line VI—VI of Fig. 6.

Fig. 7 is a fragmentary plan view of a strip of metal from which the expander ring of Figs. 4 to 6 is formed.

As shown on the drawing:

In Figs. 1 and 2 the reference numeral 10 designates generally a piston for an internal combustion engine. The piston 10 is equipped with the conventional top ring groove 11, middle ring groove 12, and oil ring groove 13. A conventional split solid cast iron piston ring 14 is mounted in the top groove 11 to provide a compression seal. A conventional split compression ring 15 also of cast iron composition is seated in the middle groove 12. The rings 14 and 15 have broad cylinder wall engaging faces 14a and 15a respectively.

The oil ring groove 13 is wider than the grooves 11 and 12 and is joined through oil holes such as 16 with the interior of the piston. This groove 13 has a top wall 13a and a bottom wall 13b extending radially outward from a vertical back wall 13c which is pierced at intervals by the oil holes 16.

An oil control ring assembly 17 of this invention is mounted in the oil groove 13. This assembly 17 includes a top thin flat ring segment 18, an identical bottom ring segment 19 and an intermediate combination expander and spacer ring 60. The rings 18 and 19 have rounded outer peripheral edges 18a and 19a each covered with a layer of chromium or other hard corrosion and wear resisting metal 21 so that the cylinder wall engaging edges of each ring are reinforced with a hard coating. The coating can be applied by electroplating, brazing or in any other suitable manner. The inner peripheral edges of the rings 18 and 19 are also rounded at 18b and 19b respectively but the inner peripheries are not coated with the hard metal.

As shown in Fig. 3 the thin ring segments or rails 18 and 19 are split and gaps 22 and 23 are respectively provided between the ends of the ring. These gaps will vary in width as shown, even when the rings are in operation on the piston 10 as shown in Fig. 1 to permit radial contraction and expansion of the thin rings.

The ring 60, on the other hand, has abutted together ends 61 as shown in Fig. 3. The ring 60 when radially compressed will contract with a resilient spring-like action to exert an equal outward radial load around its entire periphery. If desired, the abutted together ends 61 of the ring can be welded together to avoid possible installation difficulties arising from improper abutment of the ends. The continuous ring 60 thus formed can be easily stretched over the head of the piston 10 to snap into the groove 13. Suitable lock joints or connectors (not shown) could also be used to secure together the ends 61 of the ring 60.

The ring 60 has vertical or axially extending corrugations or convolutions and with the abutted together end edges 61 provides a continuous ring. The convolutions include sloping legs 60a connected by flat top and bottom portions 60b thereby forming radially extending segments at the top and bottom of the legs. Tabs 60c are formed at the radial inner edges of the flat portions 60b. These tabs extend alternately upwardly and downwardly from the top and bottom portions 60b so as to provide upstanding legs around the inner periphery of the ring. These legs project alternately above and below the portions 60b so as to provide abutment shoulders 60d receiving the ring segments 18 and 19 thereagainst.

The sloping legs 60a extend between the ring segments while the flat portions 60b form supports for the ring segments.

The ring 60 can be radially compressed to form a loaded expansion unit since the legs 60a will flex to permit expansion and contraction of the segments 60b. The ring 60 thus functions as a combined spacer and expander to simultaneously radially expand both of the thin rings or rails 18 and 19, and at the same time, to separate these rings and hold them against the top and bottom faces of the ring groove 13.

As shown in Fig. 7, the ring 60 is conveniently formed from a flat ribbon 62 of spring steel having a main body portion 63 with laterally projecting legs 64 at spaced intervals along one edge thereof. The legs 64 form the tabs 60c while the main body is corrugated by being bent along the dotted lines 65 to provide the sloping legs 60a and the connecting legs 60b.

The ring groove 13 can be of any desired depth since the ring 60 need not be bottomed on the groove in order to exert its expanding force. Thus, as shown in Fig. 2, the inner periphery of the ring 60 is actually spaced radially outward from the back wall 13c of the ring groove. Yet, the ring 60, by being under inherent radial compressive load, will exert its expanding force on the ring segments 18 and 19.

From the above description it will, therefore, be understood that this invention provides a packing ring assembly wherein sealing rings are urged radially outward and are held in separated relation by a self-expanding spring ring which does not depend upon engagement with a ring groove to exert its expanding force on the sealing rings. The self-expanding ring thus serves a dual function of an expander and a separator in a packing ring assembly. The combination expanding and separator ring is open around its periphery so as not to impeded free drainage of oil in oil ring assemblies. The ring can be made continuous by welding or otherwise securing the ends together and the resulting complete annulus can be stretched over the head of the piston and snapped into the oil ring groove.

I claim as my invention:

1. A combined expansion and separator ring for packing ring assemblies which comprises a spring metal corrugated self-expanding ring having convolutions providing top and bottom supporting surfaces and tabs on the support surfaces extending axially of the ring to provide abutment shoulders projecting beyond the surfaces on the opposite side of the ring at the inner periphery of the ring.

2. A combined spacer and expander ring for piston ring assemblies which comprises an axially corrugated ribbon of steel having axially spaced top and bottom rail ring supporting crowns joined by sloping legs, and tabs on the inner peripheral ends of said crowns extending alternately upwardly from said bottom crowns and downwardly from said top crowns to provide abutment shoulders at the inner periphery of the ring between the crowns.

3. A combined spacer and expander for piston ring assemblies comprising an axially corrugated metal ribbon having circumferentially spaced top crowns and circumferentially spaced bottom crowns alternating with the top crowns, sloping legs connecting the ends of the top crowns with the ends of the alternate bottom crowns, tabs integral with the inner peripheral edges of the top and bottom crowns and extending therefrom to provide abutment shoulders in the circumferential spaces between the crowns adapted to thrust against the inner peripheries of rail rings supported on the crowns.

4. A spacer and expander for supporting, spacing and outwardly pressing generally flat parted thin rails in a piston ring assembly comprising a generally circular corrugated length of flat metal ribbon having abutting ends and substantially parallel longitudinal edges, the corrugations extending generally axially and comprising upper and lower radially extending crowns connected alternately at their ends by axially extending legs, and upstanding narrow tabs on the inner ends of the crowns extending alternately upwardly and downwardly from the crowns to provide abutment shoulders at the inner periphery of the ring in the spaces between the crowns for engaging the inner peripheries of thin rails supported on the crowns.

5. A combined spacer and expander ring for piston ring assemblies and the like which comprises a ribbon of sheet metal having laterally extending spaced parallel fingers on one edge thereof, said ribbon being axially corrugated to provide alternating top and bottom crowns joined by sloping legs and said fingers being alternately bent up and down to form abutment shoulders in the spaces between the crowns.

6. A combined spacer and expander piston ring which comprises a spring metal corrugated self-expanding ring having convolutions providing supporting surfaces and sloping resilient legs at the ends of the supporting surfaces, said supporting surfaces on each side face of the ring being circumferentially separated, a tab on the inner periphery of each supporting surface and extending therefrom across the space between the circumferentially spaced surfaces to terminate at levels beyond the faces of the ring and thereby provide shoulders for thrusting against the inner peripheries of rails carried on the supporting surfaces of the ring.

References Cited in the file of this patent

UNITED STATES PATENTS 2,656,230     Phillips _____ Oct. 20, 1953